United States Patent
Trautenberg

(10) Patent No.: US 7,570,203 B2
(45) Date of Patent: Aug. 4, 2009

(54) METHOD FOR ADJUSTING THE INTEGRITY ALERT THRESHOLD IN A SATELLITE NAVIGATION SYSTEM

(75) Inventor: Hans L. Trautenberg, Ottobrunn (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 11/902,932

(22) Filed: Sep. 26, 2007

(65) Prior Publication Data
US 2008/0074318 A1   Mar. 27, 2008

(30) Foreign Application Priority Data
Sep. 27, 2006   (DE) ................ 10 2006 046 001

(51) Int. Cl.
*G01S 5/14* (2006.01)
(52) U.S. Cl. .............................. 342/357.02
(58) Field of Classification Search ............ 342/357.02
See application file for complete search history.

(56) References Cited

U.S. PATENT DOCUMENTS

| | | | | |
|---|---|---|---|---|
| 6,798,377 B1 * | 9/2004 | Lupash et al. | ........ | 342/357.02 |
| 6,944,534 B2 * | 9/2005 | Trautenberg | ........ | 701/200 |
| 7,019,687 B1 * | 3/2006 | Schempp et al. | ...... | 342/357.02 |
| 7,095,369 B1 * | 8/2006 | Clark | ................... | 342/357.02 |
| 7,400,292 B2 * | 7/2008 | DiLellio | ................ | 342/357.02 |

FOREIGN PATENT DOCUMENTS

EP   1637899 A1 * 3/2006

OTHER PUBLICATIONS

Oehler et al, "The Galileo Integrty Concept and Performance," Proceedings of he GNSS-2005, The European Navigation Conference, Jul. 19-22, 2005, pp. 1-11.*
Hollreiser et al, "Galileo User Segment Overview," ION GPS/GNSS 2003, Sep. 9-12, 2003, pp. 1941-1928.*
Medal et al, "SISA Computation Algorithms and their applicability for Galileo Integrity," ION-GPS 2002, Sep. 24-27, 2002, pp. 2173-2184.*

* cited by examiner

*Primary Examiner*—Gregory C Issing
(74) *Attorney, Agent, or Firm*—Crowell & Moring LLP

(57) ABSTRACT

In a method for adjusting the integrity alert threshold in a satellite navigation system, an alert message for a satellite is sent when an estimated signal error of the satellite signal emitted by the satellite is greater than a defined integrity alert threshold. According to the invention one or more parameters in a data stream emitted by the satellite are varied, and the integrity alert threshold is adjusted based on the changed parameters.

8 Claims, 2 Drawing Sheets

METHOD FOR ADJUSTING THE INTEGRITY ALERT THRESHOLD IN A SATELLITE NAVIGATION SYSTEM

BACKGROUND AND SUMMARY OF THE INVENTION

This application claims the priority of German patent document no. 10 2006 046 001.4, filed Sep. 27, 2006, the disclosure of which is expressly incorporated by reference herein.

The invention relates to a method for adjusting the integrity alert threshold in a satellite navigation system.

In the future European Galileo satellite navigation system, an integrity data stream will be available which permits the signaling of system or satellite failures to users. In particular, faulty satellite signals can be provided with integrity warnings.

The Galileo, it should be noted, will differentiate among different user levels as follows: Users of level A are dynamic applications with a high horizontal and vertical position precision, such as airplane approaches, or the locating of trains on secondary lines. In contrast, users of level B have lower demands on the position precision, such as aviation en-route. Finally, the position precision demands are the lowest for users of level C. Such users are, for example, maritime applications.

The Galileo integrity concept provides that the processing facility of the ground segment of Galileo makes a prediction concerning the precision of navigation signals. This prediction is called an expected signal error or signal in space accuracy (SISA). The actual errors of the individual navigation signals emitted by satellites or signal in space errors (SISE) are estimated by observations of the monitoring network of the Galileo system. The estimated errors are called estimated SISE (eSISE). According to the integrity concept, it is a satellite is set to "not serviceable" by way of an alert (IF: integrity flag) as soon as the estimated signal error eSISE of this satellite is greater than an integrity alert threshold (TH: threshold).

Since the integrity alert thresholds differ for the above-mentioned user levels, (particularly the threshold for users of level A, which is the lowest), this has the result that satellites which are not serviceable for a level A user are also not serviceable for a level B and C user. Significantly, if separate alerts existed for the level B and C users, they would still be serviceable; however, the transmission rates for alerts do not permit separate alerts for the different user levels.

In the Galileo system, the integrity alert threshold is calculated as the product of a pre-factor and the root of the sum of squares of the expected signal error (SISA) and of the precision of the signal observation or signal in space monitoring accuracy (SISMA), as follows:

$$TH = k_{pfa} \cdot \sqrt{SISA^2 + SISMA^2}$$

The pre-factor $k_{pfa}$ is determined by the permitted false alert rate.

One object of the present invention is to provide a method of adjusting the integrity alert threshold in a satellite navigation system, such that different integrity demands, particularly for different user levels, can be satisfied by means of a data stream.

This and other objects and advantages are achieved by the method according to the invention, which includes changing one or more parameters in a data stream emitted by a satellite of a navigation system, which parameters cause an adjustment of the integrity alert threshold. In addition, the invention also provides for differently interpreting a data stream emitted by a satellite of a navigation system, particularly in a receiver, specifically in such a manner that the satellite navigation system is classified as serviceable under conditions which differ from previous conditions.

Another feature of the invention provides a computer program for implementing a method according to the invention if the computer program is carried out on a computer. The computer program may be stored on a data carrier, for example, a visual data carrier such as a CD-ROM or DVD, a magnetic data carrier, such as a floppy disk, or an electronic data carrier, such as a memory card.

Other objects, advantages and novel features of the present invention will become apparent from the following detailed description of the invention when considered in conjunction with the accompanying drawings.

DETAILED DESCRIPTION OF THE DRAWINGS

Figure 1:
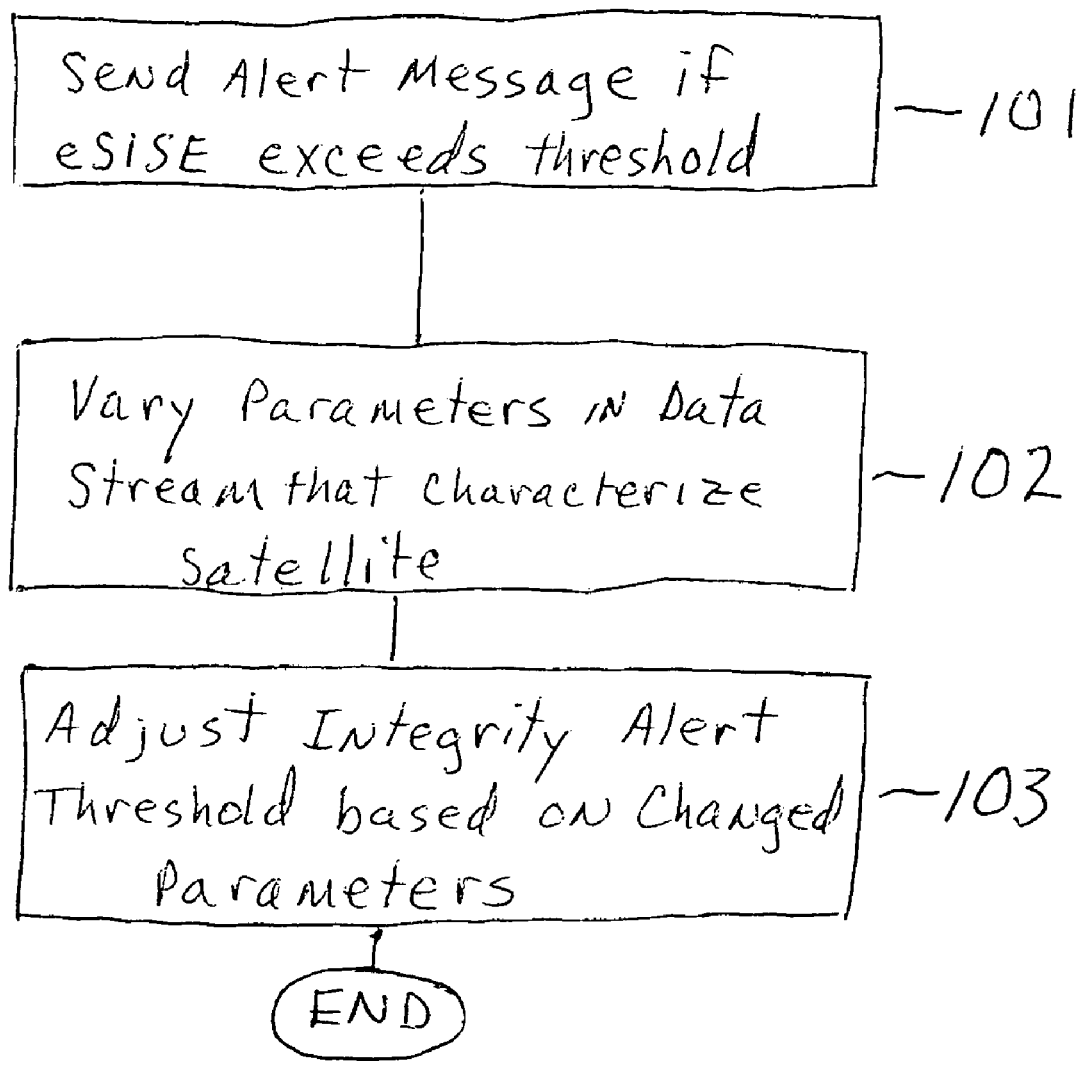
FIG. 1 is a flow diagram that depicts the steps performed according to the first embodiment of the invention.

One embodiment of the invention, illustrated in FIG. 1, provides a method of adjusting the integrity threshold in a satellite navigation system by means of the following steps:

Sending an alert message (Step 101) for a satellite when an estimated signal error of the satellite signal emitted by the satellite is greater than a defined integrity alert threshold;

Varying one or more parameters in a data stream emitted by the satellite (Step 102); and Adjusting the integrity alert threshold on the basis of the changed parameters (Step 103).

The alert message is sent by a ground segment of the satellite navigation system. In particular, it may comprise a message for increasing the value for the precision of the satellite observation, which message causes the value to be calculated according to the following formula:

$$SISMA = \sqrt{\frac{eSISE^2}{k_{pfa}^2} - SISA^2}$$

wherein SISMA is the value of the precision of the satellite observation; SISA is an expected signal error; eSISE is the estimated signal error; and $k_{pfa}$ is a pre-factor. However, the alert message may also comprise a message for adjusting the integrity warning threshold to a value which is greater than or equal to the current value for the estimated signal error. Adjustment of the integrity alert threshold may take place on the basis of the changed parameters in a receiver of the emitted data stream.

Figure 2:
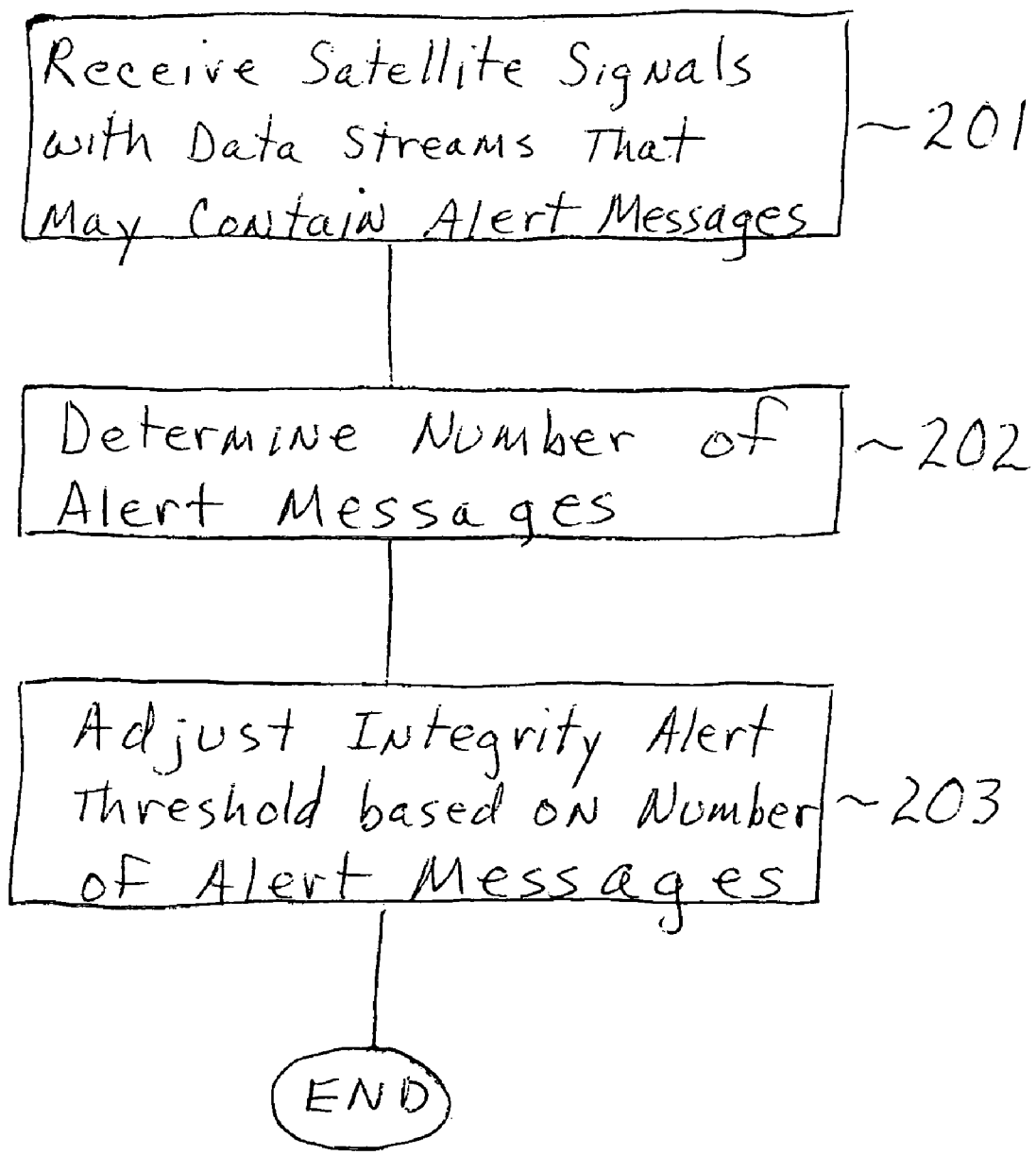
FIG. 2 is a flow diagram that depicts the steps performed in a second embodiment of the invention.

According to a further embodiment of the invention shown in FIG. 2, a method of adjusting the integrity alert threshold in a satellite navigation system includes the following steps:

Receiving data streams of the satellites transmitted with the satellite signals, which may contain alert messages of the respective satellites (Step 201);

Determining the number of alert messages (Step 202); and

Adjusting the integrity alert threshold on the basis of the determined number of alert messages (Step 203).

Above all, the adjusting of the integrity alert threshold can take place as a function of a user level. In particular, the integrity alert threshold for a second user level can be reduced when a certain number of alert messages for a first user level were determined. Furthermore, according to an embodiment of the invention, a receiver for satellite navigation signals is provided which is constructed for implementing this method.

In the Galileo system, for a satellite whose estimated signal error eSISE exceeds a defined integrity alert threshold TH, the ground segment of the satellite navigation system normally emits a "don't use" alert for this satellite. At the receivers of satellite navigation signals, this has the effect that the signal of this satellite is not used for a navigation. While this alert may be meaningful for the users of level A with high integrity demands, the users of levels B and C with lower integrity demands possibly could still meaningfully process the signal of the satellite.

In order to meet these different integrity demands of the users of different levels, according to the invention, for a satellite whose estimated signal error eSISE is greater than the integrity alert threshold TH for this satellite, instead of a "don't use" alert, a special alert (double SISMA alert) can now be sent which sets the applicable SISMA for this satellite to a SISMA which is calculated according to the formula $$SISMA = \sqrt{\frac{eSISE^2}{k_{pfa}^2} - SISA^2}$$

For a level A user, this adjustment of the integrity alert threshold has the same effect as a "don't use" alert, because, as a result of the new SISMA and the new integrity alert threshold calculated therefrom, the integrity risk at the alert limit rises above the tolerable integrity risk at the alert limit.

As an alternative, instead of an alert for increasing the SISMA, an alert may be sent in which the TH for the satellite is set to a value greater than or equal to the value of the momentary eSISE.

For a level B and C user, it is very probable that this alert does not let the integrity risk at his or her alert limit rise above the tolerable integrity risk at his or her alert limit and he or she therefore does not receive an alert. Thus, the level B or C user clearly has fewer continuity events than the level A user because only a clearly greater SISMA and therefore TH at his greater alert limit causes a continuity event.

It is important to differentiate between alerts for satellites and alerts for the user. An alert for a satellite changes one or more parameters by which this satellite is described. From all these parameters for all satellites used in the position solution, a receiver then determines whether an alert has to be emitted to the user.

As a result, the different continuity demands and integrity demands of the level A, B and C users can be satisfied by a single data stream which originally had been intended only for satisfying the requirements of the level A users. This is achieved without increasing the transmission rate because the satellite is no longer alerted as being out of order as soon as the estimated signal error is greater than the momentary integrity alert threshold. Rather, by way of an immediately effective alert message for increasing the SISMA, the integrity alert threshold is raised to the estimated error. As a result, an alert for a level A user does not necessarily become an alert for a level B and C user, and clearly higher continuities can be achieved for the level B and C user.

A further solution of the problems consists of the fact that according to the invention, no changes are carried out in the ground segment, and instead the data stream is changed. But the system is declared serviceable under different prerequisites, by the navigation warning algorithm implemented in the user receiver.

Heretofore, the satellite navigation system had been declared serviceable by the navigation warning algorithm when only a maximum of n(n=6) "critical" satellites were contained in the position solution with integrity. (A satellite is "critical" if its failure causes the system to be declared no longer serviceable by the navigation warning algorithm because of the rise of the integrity risk above the integrity risk alert threshold). According to the invention, however, the system is now declared serviceable by the navigation algorithm if only the failure of at least m satellites causes the system to be declared no longer serviceable by the navigation warning system because of the rise of the integrity risk above the integrity risk alert threshold.

When the probability of the failure of a satellite in 15 seconds $p_{15}=10^{-6}$, and m=6 critical satellites are permitted, the continuity risk amounts to $m \cdot p_{15}=6 \cdot 10^{-6}$ in 15 seconds. In contrast, when only the failure of the second satellite has the result that the system is no longer serviceable, and, after the failure of the first satellite, m=6 critical satellites are permitted and N=10 satellites are used, the continuity risk will be $N \cdot p_{15} \cdot 6 \cdot p_{15} = 6 \cdot 10^{-11}$ in 15 seconds. It now becomes possible to provide continuity for clearly longer time intervals (stricter continuity demands). For one hour, the continuity risk amounts to $1-(1-N \cdot p_{15} \cdot 6 \cdot p_{15})^{3600/15}=1-(1-6 \cdot 10^{-11})^{240}=1.44 \cdot 10^{-8}$. Without the invention, the continuity risk would be at $1.44 \cdot 10^{-3}$.

Also as a result of this solution, the different continuity and integrity demands of level A, B users can be satisfied by means of a single data stream which originally had been intended only to satisfy the requirements of the level A users. This is achieved without increasing the transmission rate in that the data stream is interpreted differently. As a result, an alert for a level A user does not necessarily become an alert for a level B user because the level B user receives an alert by way of his navigation warning algorithm only at the $m^{th}$ alert for a lever A user. Thus, clearly higher continuities can be achieved for the level B user.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A method of operating a satellite navigation system, said method comprising:
   a ground segment of said satellite navigation system sending an alert message for a satellite of said satellite navigation system when an estimated signal error of a signal emitted by said satellite is greater than a defined integrity alert threshold;
   in response to said alert message, said satellite varying one or more parameters in a data stream emitted by said satellite, which parameters characterize said satellite;
   a receiver of said data stream adjusting said integrity alert threshold on the basis of the changed parameters; and
   said receiver determining whether to emit an integrity alert to a user of said receiver, based on the adjusted integrity alert threshold and on a required precision level for said user.

2. The method according to claim 1, wherein:
the alert message comprises a message for increasing the value of the precision of the satellite observation;
the message for increasing the value of the precision of the satellite observation causes the value to be calculated according to the formula $$SISMA = \sqrt{\frac{eSISE^2}{k_{pfa}^2} - SISA^2} \text{ ; and}$$

SISMA is the value of the precision of the satellite observation, SISA is an expected signal error, eSISE is the estimated signal error and $k_{pfa}$ is a pre-factor.

3. The method according to claim 1, wherein the alert message comprises a message for adjusting the integrity alert threshold to a value greater than or equal to the current value for the estimated signal error.

4. A method of adjusting an integrity alert threshold in a satellite navigation system, said method comprising:
a receiver unit operated by a user of said system receiving data streams of satellites that are included in said system, which data streams are transmitted with satellite signals that contain alert messages of the respective satellites whenever an estimated signal error of said satellite signals exceeds a defined integrity alert threshold;
said receiver determining the number of alert messages; and
said receiver adjusting the integrity alert threshold based on the determined number of alert messages.

5. The method according to claim 4, wherein the step adjusting of the integrity alert threshold is performed as a function of a required precision level of said user.

6. The method according to claim 5, wherein the integrity alert threshold is adjusted for a second user level when a set number of alert messages has been determined for a first user level.

7. A data carrier having encoded therein a computer program for implementing the method according to claim 1.

8. A method for processing data transmitted by a satellite that is part of a satellite navigation system, said method comprising:
said satellite transmitting a data signal that includes a data stream containing parameters which characterize operation of the satellite, and which change in response to changes in operational status of the satellite;
a ground segment receiving said data signal and adjusting an integrity alert threshold based on changes in said parameters;
said ground segment transmitting an alert message for modifying said integrity alert threshold;
based on said alert message, a user receiver determining whether the system is serviceable, according to prerequisites applicable to that user, by implementing a warning algorithm.

* * * * *